United States Patent
Foucoin et al.

(10) Patent No.: US 10,030,729 B2
(45) Date of Patent: Jul. 24, 2018

(54) RETURN SPRING OF A BRAKE SHOE INCLUDING WEAR PLAY COMPENSATION MEANS, DISK BRAKE AND REPLACEMENT KIT

(71) Applicant: CHASSIS BRAKES INTERNATIONAL B.V., Amsterdam (NL)

(72) Inventors: Alexandre Foucoin, Montevrain (FR); Didier Montegu, Livry-Gargan (FR); Sandra Merrien, Paris (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 0 days.

(21) Appl. No.: 14/879,483

(22) Filed: Oct. 9, 2015

(65) Prior Publication Data
US 2016/0102721 A1    Apr. 14, 2016

(30) Foreign Application Priority Data
Oct. 10, 2014   (FR) ..................... 14 59731

(51) Int. Cl.
*F16D 65/54*      (2006.01)
*F16D 65/097*     (2006.01)
*F16D 55/225*     (2006.01)

(52) U.S. Cl.
CPC ......... *F16D 65/543* (2013.01); *F16D 55/225* (2013.01); *F16D 65/0978* (2013.01)

(58) Field of Classification Search
CPC ... F16D 55/225; F16D 65/0978; F16D 65/543

USPC ............. 188/73.38, 73.37, 72.3, 71.8, 196 R
See application file for complete search history.

(56) References Cited

U.S. PATENT DOCUMENTS

| 5,687,817 A | 11/1997 | Kobayashi et al. |
| 7,163,089 B2 * | 1/2007 | Nogiwa ............ F16D 65/0977 188/73.38 |
| 7,513,340 B2 * | 4/2009 | Hendrich ........... F16D 65/0972 188/73.36 |

(Continued)

FOREIGN PATENT DOCUMENTS

| EP | 2 072 850 A1 | 6/2009 |
| FR | 3 004 500 A1 | 10/2014 |

(Continued)

OTHER PUBLICATIONS

FR Search Report, dated Jun. 12, 2015, from corresponding FR application.

*Primary Examiner* — Thomas J Williams
*Assistant Examiner* — Mariano Sy
(74) *Attorney, Agent, or Firm* — Young & Thompson

(57) ABSTRACT

A spring (48) includes successively a portion (50) for fixing the spring to the disk brake, a rigid branch (B2) connected to the fixing portion (50) by a bend (P1) plastically deformable about a first deformation axis (A1), another rigid branch (B3) connected to the aforementioned rigid branch (B2) by a second plastically deformable bend (P2), and a further rigid branch (B4) connected to the aforementioned rigid branch (B3) by a third plastically deformable bend (P3) that cooperates directly or indirectly with an associated portion of the brake shoe, each rigid branch (B2, B3, B4) being a strip that lies in a plane parallel to the first deformation axis (A1).

27 Claims, 5 Drawing Sheets

(56) References Cited

U.S. PATENT DOCUMENTS

| | | | |
|---|---|---|---|
| 8,439,171 B2* | 5/2013 | Kaneko | F16D 65/0972 188/72.3 |
| 8,636,119 B2* | 1/2014 | Bach | F16D 65/097 188/72.3 |
| 9,080,624 B2* | 7/2015 | Merrien | F16D 55/2265 |
| 2004/0195057 A1* | 10/2004 | Ooshima | F16D 65/0972 188/73.38 |
| 2009/0159376 A1* | 6/2009 | Rossignol | F16D 65/095 188/73.38 |
| 2010/0051393 A1* | 3/2010 | Arioka | F16D 65/0972 188/72.3 |
| 2010/0187050 A1* | 7/2010 | Hayashi | F16D 65/097 188/72.3 |
| 2010/0243389 A1 | 9/2010 | Miura et al. | |
| 2012/0186918 A1* | 7/2012 | Wakabayashi | F16D 65/0972 188/72.3 |
| 2014/0326548 A1* | 11/2014 | Merrien | F16D 65/0006 188/73.38 |
| 2015/0129375 A1 | 5/2015 | Rossignol et al. | |
| 2015/0211589 A1 | 7/2015 | Mallmann | |
| 2015/0247542 A1* | 9/2015 | Yukumi | F16D 65/0977 188/72.3 |

FOREIGN PATENT DOCUMENTS

| | | |
|---|---|---|
| WO | 2014/029840 A1 | 2/2014 |
| WO | 2014/050811 A1 | 4/2014 |

\* cited by examiner

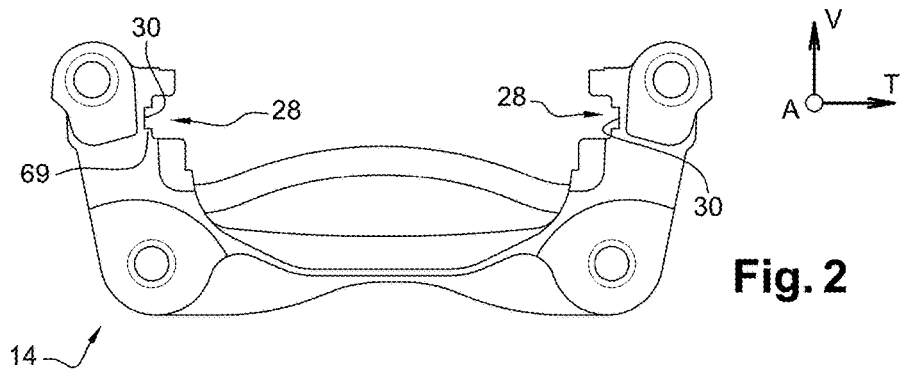
Fig. 2
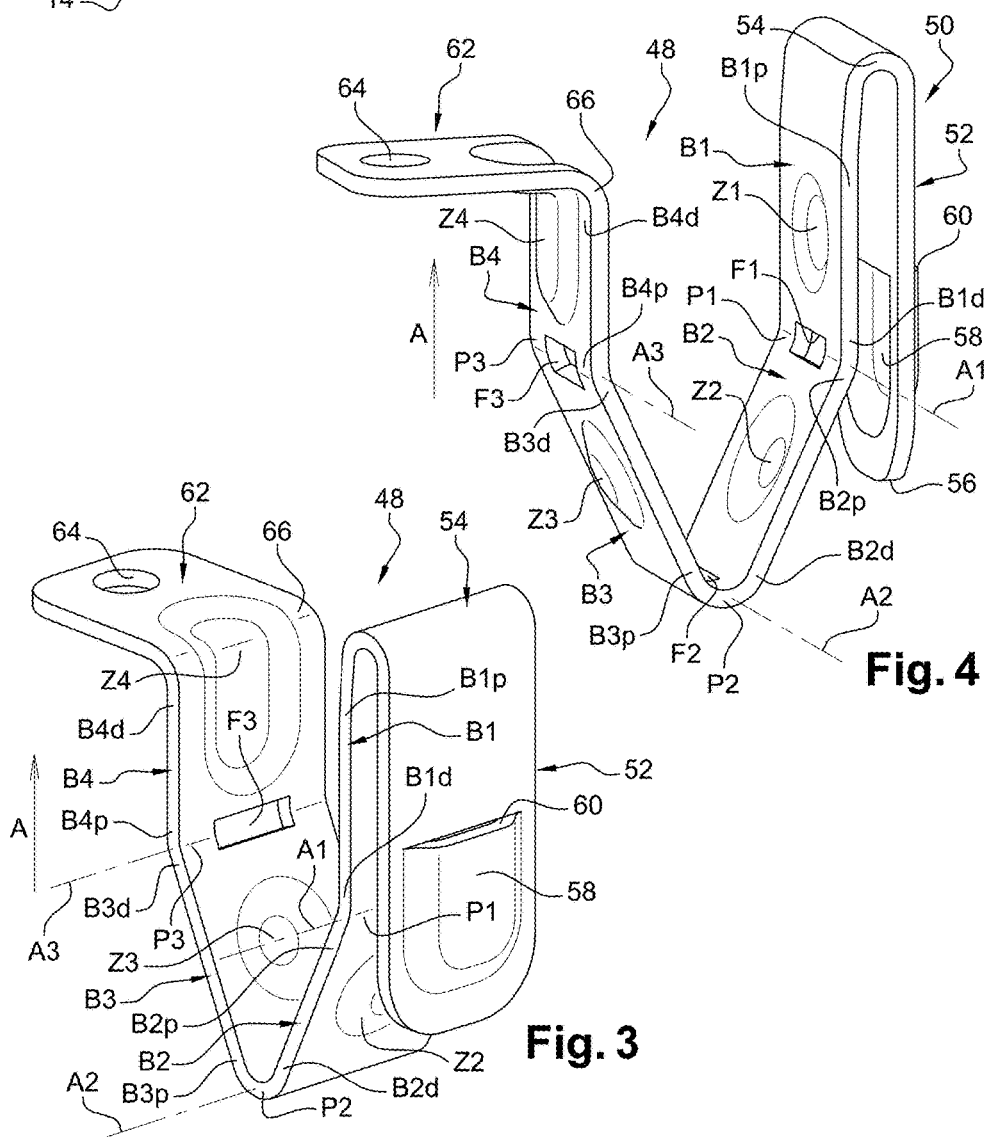
Fig. 4
Fig. 3

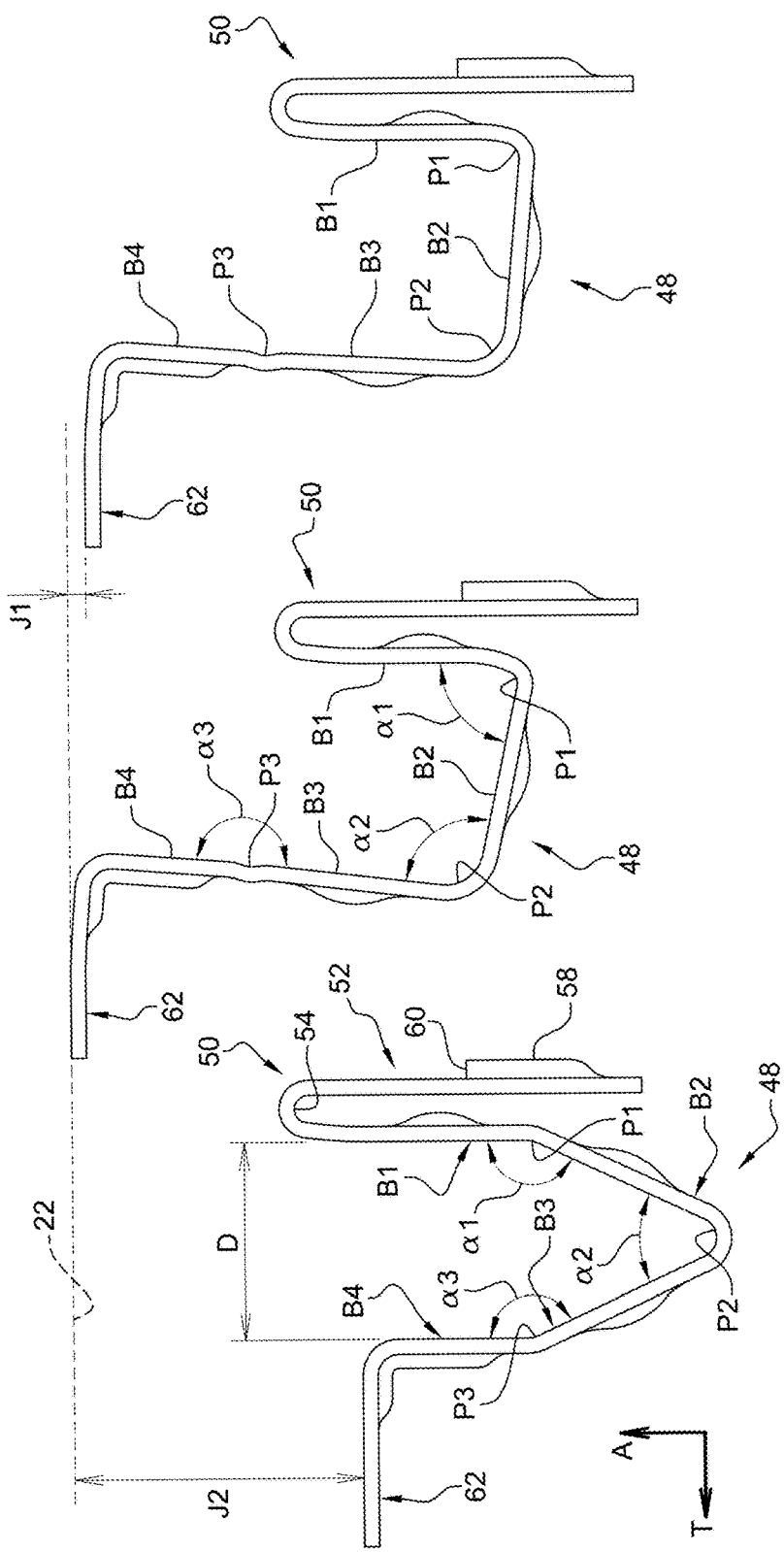

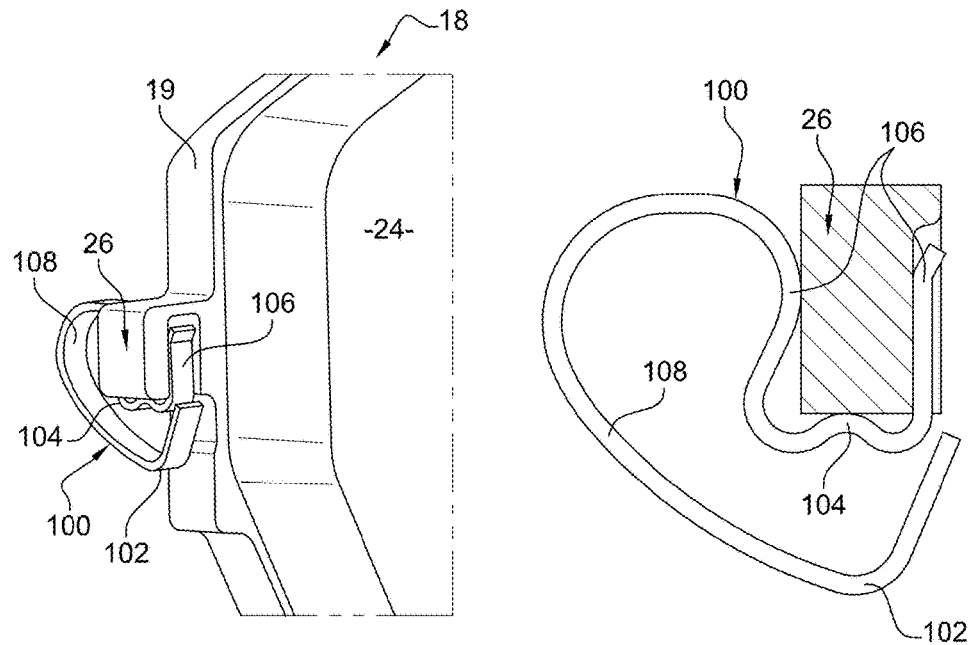
Fig. 7A  Fig. 7B
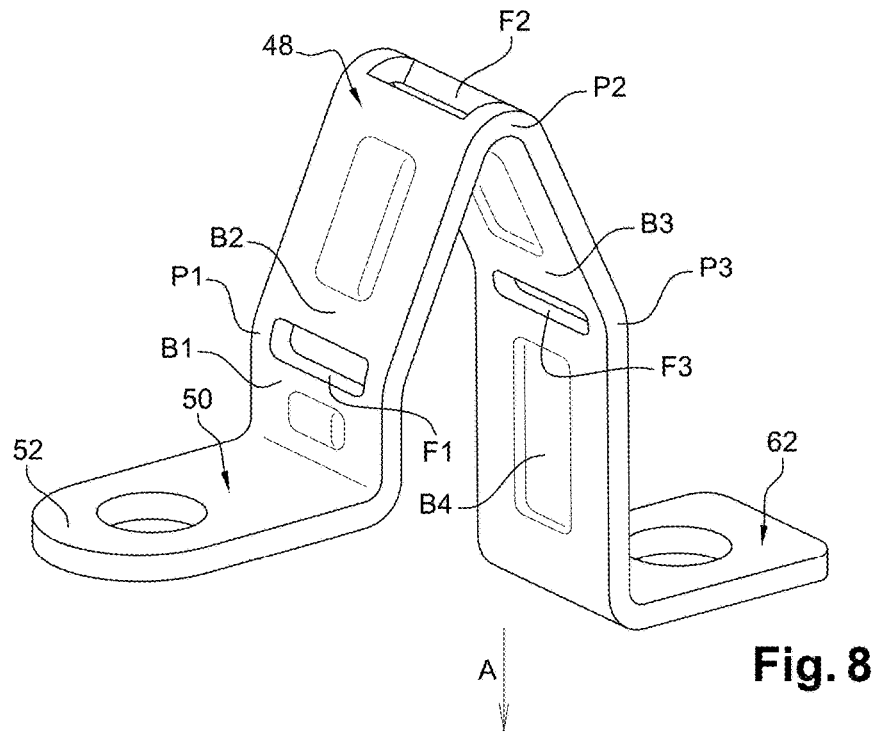
Fig. 8

RETURN SPRING OF A BRAKE SHOE INCLUDING WEAR PLAY COMPENSATION MEANS, DISK BRAKE AND REPLACEMENT KIT

TECHNICAL FIELD OF THE INVENTION

The invention relates to a motor vehicle disk brake.

The invention notably relates to a return spring of a brake shoe including means for compensating the wear play of a friction lining of the brake shoe through plastic deformation.

TECHNICAL BACKGROUND OF THE INVENTION

The invention relates more particularly to a motor vehicle disk brake of the type described and shown in French patent application FR-A1-3004500, which includes:
- a brake disk that lies in a plane transverse to an axially oriented axis of rotation of the disk;
- a support fixed relative to a chassis of the vehicle,
- at least one brake shoe which includes a friction lining a transverse friction face of which cooperates with an associated braking track of the disk, the brake shoe being mounted to slide axially in the support between an active front position in which the friction face bears against the associated annular track of the disk and an inactive rear position in which the friction face is spaced axially from the associated annular track of the disk by a particular operating clearance,
- at least one spring for elastically returning the brake shoe to its inactive position, which is disposed between the brake shoe and the support, for example.

In a disk brake, the sliding of the brake shoes toward their active position is driven by a piston. The two brake shoes then clamp the disk strongly to slow down its rotation. The braking operation is therefore an active operation.

The brake shoes are pushed back toward their inactive position by the rotating disk. This is therefore a passive operation.

However, it can happen that the disk does not push the brake shoes back with sufficient force to separate them from the disk by a sufficient distance. For example, this can occur if the sliding of the brake shoes is of insufficient quality or even jammed, or if the design creates "restitution".

Although the brake shoes are no longer clamped actively against the disk, each of the annular tracks of the latter nevertheless rubs at all times against the friction lining carried by the associated brake shoe. The friction linings are then subjected to premature non-functional wear.

Moreover, this permanent friction is liable to cause heating that is harmful for some members of the disk brake.

This permanent friction also generates a residual torque that opposes the rotation of the disk. This increases the fuel consumption of the vehicle as well as degrading the performance of the vehicle.

To solve these problems of wear and heating, the aforementioned document proposes a disk brake in which the return spring includes means for compensating wear play of the friction lining of the brake shoe that deform plastically if the travel of the brake shoe to its active position is greater than said predetermined operating clearance.

To this end, the return spring includes at least one axially oriented section that is elastically deformable in traction between a rest state and a state of maximum elongation the value of which is equal to the particular operating clearance, the spring including at least one section deformable plastically by an axial traction force, forming said wear play compensating means, this plastically deformable section being conformed so as to be stretched plastically if the travel of the brake shoe to its active position is greater than the particular operating clearance.

In accordance with the embodiment proposed in this document, the plastically deformable section is formed by accordion folding a section of the blade.

In accordance with another design described and shown in the document WO-A1-2014/029840, the return spring includes, successively:
- a portion for fixing the return spring to the disk brake;
- a second rigid branch a proximal end of which is connected to the fixing portion by a first bend plastically deformable about a first deformation axis orthogonal to the axial direction of movement of the brake shoe and parallel to the plane in which the second rigid branch lies; and
- a third rigid branch a proximal end of which is connected to a distal end of the second rigid branch by a second bend plastically deformable about a second deformation axis parallel to the first deformation axis.

The invention aims to improve the design and the performance of such return springs and notably to regularize the performance of the spring in terms of elasticity and the value of the elastic return force produced by the spring and to regularize the direct or indirect cooperation of the spring with an associated portion of the brake shoe.

SUMMARY OF THE INVENTION

To this end, the invention proposes a spring for elastically returning a brake shoe of a disk brake axially to an inactive position,
said spring including means for compensating wear play of a friction lining of the brake shoe that are deformed plastically when a travel of the brake shoe in an axial direction of movement as far as an active braking position is greater than a particular operating clearance,
the return spring successively including:
- a portion for fixing the return spring to the disk brake;
- a second rigid branch a proximal end of which is connected to the fixing portion by a first bend plastically deformable about a first deformation axis orthogonal to the axial direction of movement of the brake shoe and parallel to the plane in which the second rigid branch lies; and
- a third rigid branch a proximal end of which is connected to a distal end of the second rigid branch by a second bend plastically deformable about a second deformation axis parallel to the first deformation axis, characterized in that:
- the return spring includes a fourth rigid branch a proximal end of which is connected to a distal end of the third rigid branch by a third bend plastically deformable about a third deformation axis parallel to the first deformation axis that cooperates directly or indirectly with an associated portion of the brake shoe;
- each rigid branch is a strip that lies globally in a plane parallel to the first deformation axis; and
- the fourth rigid branch is transversely spaced relative to the fixing portion.

In accordance with other features of the spring:
- the fixing portion includes a first rigid branch that is a strip that lies in a plane parallel to the first deformation axis and the proximal end of the secondary rigid branch is connected to a distal end of the first rigid branch by the first plastically deformable bend;

the first rigid branch extends parallel to the axial direction of movement of the brake shoe;

each rigid branch is straight;

each rigid branch includes stiffening means;

each elastically deformable bend includes an area of weakened mechanical properties;

each elastically deformable bend is a bent portion of a strip including a window oriented parallel to the first deformation axis;

the spring is produced in one piece by cutting and shaping a sheet of material;

the spring is produced in one piece by cutting, pressing and bending a sheet of metal;

the rigid branches and the bends are produced in one piece by cutting, pressing and bending a strip of constant width;

the second rigid branch and the third rigid branch are of substantially equal length;

in a state preceding any plastic deformation of the bends, the first rigid branch and the second rigid branch form an angle equal to approximately 166 degrees;

in a state preceding any plastic deformation of the bends, the third rigid branch and the fourth rigid branch form an angle equal to approximately 161 degrees;

in the state of maximum plastic deformation of the bends, the third rigid branch and the fourth rigid branch are substantially aligned;

in the state of maximum plastic deformation of the bends, the second rigid branch and the third rigid branch form an angle that is substantially a right angle.

in the state of maximum plastic deformation of the bends, the first rigid branch and the second rigid branch form an angle that is substantially a right angle;

the spring is made from a material selected from a group including stainless steel, X2CrNbCu21 steel, 304L steel, gold, lead, a synthetic material, a synthetic material with a polymer matrix reinforced by natural or synthetic fibers;

the spring is made from a material the breaking strain of which is between 30% and 60%, the tensile strength of which is between 400 MPa and 1,000 MPa, and the 0.2% strain of which is between 0 and 500 MPa;

the spring is made from a material the breaking strain of which is between 40 and 60%, the tensile strength of which is between 400 MPa and 700 MPa, and the 0.2% strain of which is between 150 and 400 MPa;

the spring is made from a material the breaking strain of which is between 50 and 60%, the tensile strength of which is between 400 MPa and 600 MPa, and the 0.2% strain of which is between 200 and 300 MPa.

The invention also proposes a motor vehicle disk brake that includes:

a brake disk that lies in a plane transverse to an axially oriented axis of rotation of the disk;

a support fixed relative to a chassis of the vehicle, at least one brake shoe that includes a friction lining a transverse friction face of which cooperates with an associated braking track of the disk, the brake shoe being mounted to slide axially in the fixed support between an active front position in which the friction face bears against the associated annular track of the disk and an inactive rear position in which the friction face is spaced axially from the associated annular track of the disk by a particular operating clearance, characterized in that it includes at least one spring in accordance with the invention for elastically returning the brake shoe to its inactive position.

In accordance with other features of the disk brake:

the return spring is disposed between the brake shoe and the fixed support;

the portion for fixing the return spring to the disk brake is fixed by axial insertion in an axially oriented slide of the fixed support;

the first rigid branch of the return spring is fixed by axial insertion in an axially oriented notch of the fixed support;

the brake shoe includes at least one lateral lug for guiding sliding thereof that is received in an axial slide of the fixed support and said fixing notch is formed in a back of the slide;

the brake shoe includes at least one lateral lug for guiding sliding thereof that is received in an axial slide of the support that the notch is formed by the slide;

the disk brake includes a slider that espouses the walls of the slide and is fixed to the fixed support;

the first rigid branch of the return spring on the disk brake includes a stop that is in contact with a facing face of the fixed support to block the axial sliding of the return spring in the direction corresponding to the axial movement of the brake shoe toward its active braking position.

The invention further proposes a replacement kit for a motor vehicle disk brake in accordance with the invention characterized in that it includes at least one brake shoe and two return springs matched to the brake shoe each of which is produced in accordance with the invention.

The replacement kit may further include two springs for mounting the brake shoe in the disk brake.

BRIEF DESCRIPTION OF THE FIGURES

Other features and advantages of the invention will become apparent on reading the following detailed description, to understand which reference should be made to the appended drawings, in which:

FIG. 2 is a front view showing the fixed support of the disk brake from FIG. 1 provided with slides to receive return springs of an associated brake shoe in its inactive position;

FIG. 3 is a detail perspective view that shows a return spring of the brake shoe in accordance with the invention;

FIG. 4 is a perspective view similar to that of FIG. 3 from a different angle;

FIG. 5A is a lateral view of the return spring shown in FIGS. 3 and 4 in a "new" state in which it is not deformed elastically or plastically;

FIG. 5B is a view similar to that of FIG. 5A that shows the play compensation spring after its maximum plastic deformation corresponding to an active position of the associated brake shoe clamped against the disk;

FIG. 5C is a view similar to that of FIG. 5B that shows the play compensation spring after its maximum plastic deformation corresponding to a position of the associated brake shoe returned to its inactive position by the return spring;

FIG. 7A is a diagrammatic perspective view that shows a design variant in which each lug of a brake shoe is equipped with a "radial" spring;

FIG. 7B is a sectional view of a detail from FIG. 7A;

FIG. 8 is a view similar to those of FIGS. 3 and 4 that shows a variant of the return spring in accordance with the invention.

DETAILED DESCRIPTION OF THE FIGURES

In the remainder of the description, elements having an identical structure or similar functions are designated by the same references.

There are adopted, in a non-limiting way and without reference to terrestrial gravity, axial, vertical and transverse orientations referred to the "A, V, T" dihedron in the figures.

The axial orientation "A" is directed from the back toward the front, parallel to a rotation axis "B" of the disk 12.

The horizontal plane is defined as being an axial transverse plane.

Figure 1:
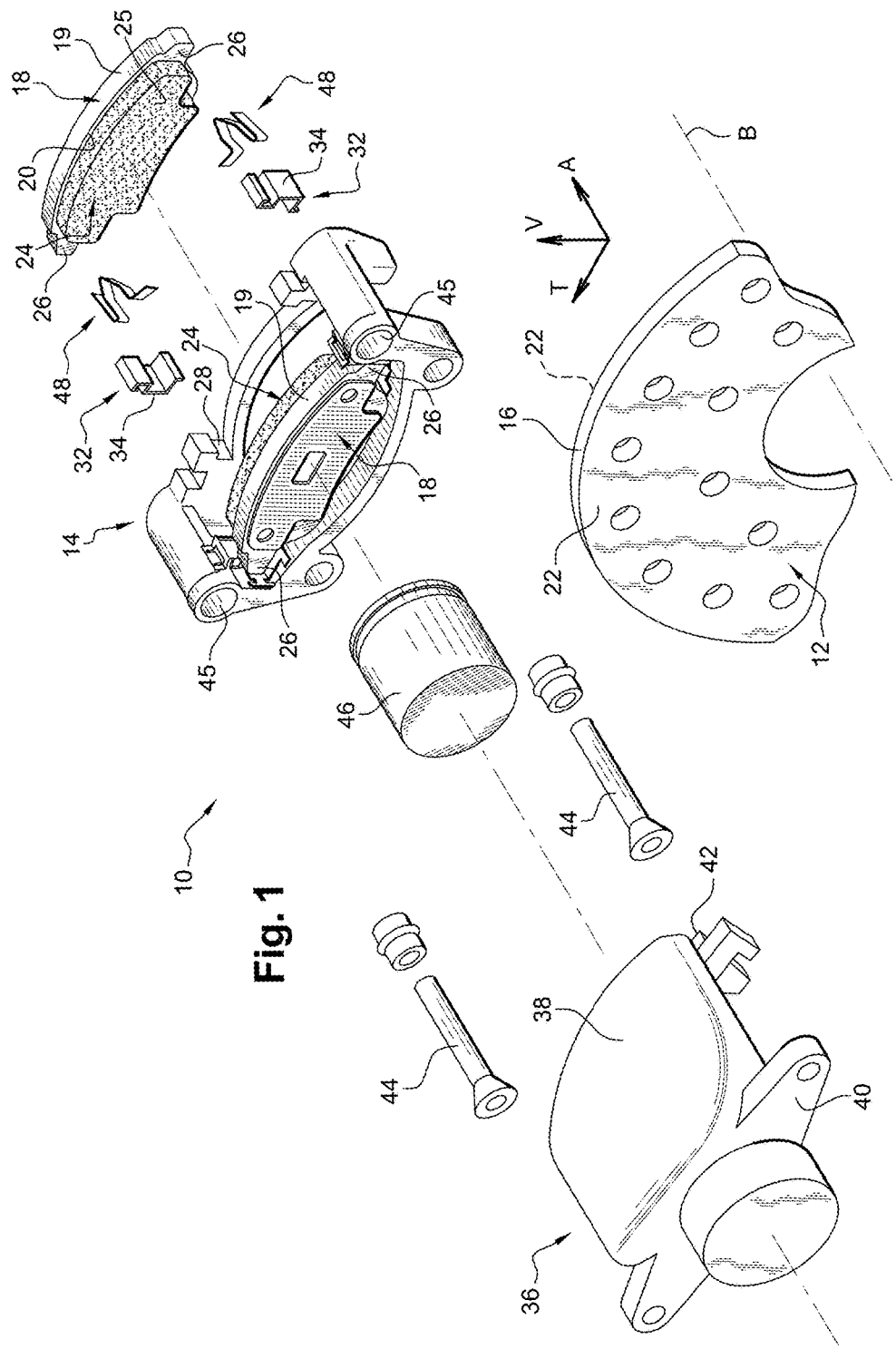
FIG. 1 is an exploded perspective view that represents a disk brake in accordance with one embodiment of the invention.

There is shown diagrammatically in FIG. 1 a motor vehicle disk brake 10. Here this is a "floating caliper" or "sliding caliper" disk brake 10.

As known in itself, the disk brake includes a disk 12 that is mounted to turn about an axially oriented rotational axis "B". The disk 12 is constrained to rotate with a wheel (not shown) of the motor vehicle.

The disk brake 10 includes a support 14, also known as a yoke, which is fixedly mounted relative to the chassis (not shown) of the vehicle. The fixed support 14 straddles a peripheral edge 16 of the disk 12.

Opposed rear and front brake shoes 18 (also referred to as inner and outer shoes) are mounted to slide axially in the fixed support 14 on respective opposite sides of the disk 12.

The front and rear brake shoes 18 have a structure and an arrangement on the fixed support 14 that are identical in so far as they are symmetrical with respect to a median vertical transverse plane.

Only the rear brake shoe 18 is described hereinafter, the description being applicable to the front brake shoe 18 by interchanging the front and rear directions.

The rear brake shoe 18 takes the form of a friction face support vertical transverse plate 19. The brake shoe 18 has a front face 20 that is oriented toward a facing rear face 22 of the disk 12 in the form of an annular track. The front face 20 carries a friction lining 24 a front vertical transverse friction face 25 of which is adapted to cooperate with the face 22 of the disk 12.

Each of the opposite transverse ends of the brake shoe 18 includes a lateral lug 26 that is mounted, with clearance, to slide in an associated slide 28 of an associated arm of the caliper or fixed support 14.

Each slide 28 is axially oriented and, in section on a vertical transverse plane orthogonal to the axes A and B, has a "C" shape that is open transversely toward the associated lateral lug 26 of the brake shoe 18. The slide 28 is delimited transversely by a globally vertical and axially oriented back 30.

In the example shown in the figures, a slider 32 is disposed transversely between each lateral lug 26 and the associated slide 28.

Each slider 32 is formed by a "C"-section leaf spring that espouses the walls of the associated slide 28. The slider 32 therefore includes a vertically and axially oriented back 34 that is arranged to face the back 30 of the slide 28.

The slider 32 allows a particular degree of movement of the brake shoe 18 in the fixed support 14, that is to say, generally but not in any limiting manner, an axial sliding movement and a transverse sliding movement accompanying the rotation of the disk 12 on braking.

Without departing from the scope of the present invention, and in accordance with a design that is not shown, each lateral lug 26 may be equipped with a so-called mounting spring, of the type described and shown in the document FR-A1-2.925.636 and shown in FIGS. 7A and 7B.

The brake shoe 18 is therefore mounted to slide in the fixed support 14 in an axial direction parallel to the rotation axis B of the disk 12 and over an operating travel between:

an active front position in which the front transverse friction face 25 of the friction lining 24 bears against the facing face 22 of the disk 12; and an inactive rear position in which the front transverse friction face 25 of the friction lining 24 of the brake shoe 18 is axially spaced from the associated face 22 of the disk 12 by a particular operating clearance "J1".

On braking, the clamping of the brake shoes 18 by moving them from their inactive position to their active position is driven by a brake caliper 36 of the disk brake 10.

As known in itself, the caliper 36 includes a caliper body 38 that extends axially above and covers the fixed support 14 and a front flange 40 and a rear flange 42 that extend radially toward the axis "B" from the rear and front edges of the caliper body 38.

The front flange 42 faces the front brake shoe 18 and the rear flange 40 faces the rear brake shoe 18.

Here the caliper 36 is mounted to slide axially relative to the fixed support 14 by means of two parallel slide pins 44 each of which is received in and slides in an associated axial bore 45 of the fixed support 14.

As known in itself, the rear flange 40 of the caliper 36 carries at least one axial piston 46 a front transverse bearing face of which is adapted to cooperate, on braking, with the facing transverse face of the rear brake shoe 18 to urge it axially forward so as to exert an axial clamping force on the front transverse friction face 25 of the friction lining 24 to clamp it against the facing face 22 of the disk 12.

By reaction, the caliper 36 slides axially toward the rear and, in a symmetrical manner, the front flange 42 applies a force to the front brake shoe 18 to clamp the rear transverse friction face 25 of the friction lining 24 of the front brake shoe 18 against the facing front face 22 of the disk 12.

When, after braking, the piston 46 ceases to apply a force to the rear brake shoe 18, the brake shoes 18 are generally returned from their active position to their inactive position by the rotation of the disk 12 which "pushes back" each brake shoe 18 to its inactive position.

Nevertheless, in some cases, it is found that the repulsion force exerted by the disk 12 is insufficient to push each of the brake shoes 18 back into its respective inactive position. The friction lining 24 of the brake shoes 18 therefore continues to rub against the disk 12 although there is no clamping of the friction linings of the brake shoes by the caliper 36.

Following braking, to guarantee that each brake shoe 18 returns to an inactive position, the disk brake 10 is equipped with means for elastically returning the brake shoe 18 to its inactive position. These return means take the form of return springs that are disposed between the brake shoe 18 and the fixed support 14.

Here the disk brake 10 includes four return springs 48, also referred to as "spreader" springs, each of which is arranged here between the fixed support 14 and an associated lateral lug 26 of a brake shoe 18 (this is not limiting on the invention).

Here a rear or front brake shoe 18 is therefore associated with two return springs 48 each of which cooperates directly or indirectly with the plate 19 carrying the friction lining.

One embodiment of a return spring 48 in accordance with the invention as notably represented in FIGS. 3 and 4 is described next.

The four return springs 48 are all identical and are arranged in the same manner on the fixed support 14 (this is not limiting on the invention). Only one of these return springs 48 of the rear brake shoe 18 is therefore described in detail hereinafter.

The return spring 48 takes the form of a strip of metal, for example steel, of rectangular section, the width of which extends vertically and which is made by cutting, pressing and bending a sheet of stainless steel of constant thickness, for example.

Referring in particular to FIGS. 3 and 4, the return spring 48 includes a first portion 50, referred to as the fixing portion, in the general shape of a hairpin, forming the means for fixing the spring 48 to the fixed support 14.

The portion 50 includes a blade 52 that extends axially from a bend 54 to a free end.

The portion 50 includes a second blade or strip, connected to the blade 52 by the bend 54 forming an elastic hinge, which extends globally axially parallel to the blade 52 and which, in the context of the invention, constitutes a first rigid branch B1 that lies in an axial and vertical plane.

The first branch B1 is stiffened by stiffening means consisting of a pressed area Z1.

The blade 52 includes a vertically and transversely oriented stop surface 60 that is intended to be in axial contact with a facing face 69 of the fixed support 14 to immobilize the blade 52, and therefore the spring 48, axially in the direction of the disk 12.

Here the stop face 60 is more particularly formed by the front face of a boss 58 produced in the body of the blade 52, for example by pressing.

The boss 58 projects transversely on the face of the blade 52 that is opposite the first rigid branch B1. The boss 58 has an axially elongate shape.

The bend 54 forming a hinge of the fixing part 50 is inserted axially toward the front in an associated slide 28 of the fixed support 14.

The fixing part 50 and the slide 28 are designed so that the fixing part 50 is mounted in a built-in or equivalent manner to guarantee its stability relative to the fixed support 14, notably by opposing phenomena of tilting by rotating about the axes A, V and T.

To this end, the vertical back 30 of the slide 28 may be conformed as an axial groove or notch sized to receive the blade 52 with virtually no clearance.

The shape and the dimensions of the notch 30 also enable vertical centering of the return spring 48 relative to the slide 28.

Starting from the fixing portion 50, to be more precise the axially oriented straight first rigid branch B1, the return spring 48 is successively extended by three other straight rigid branches B2, B3 and B4.

Each straight rigid branch Bi has a proximal end Bip relative to the fixing portion 50 and a distal end Bid.

The first branch B1 therefore has its proximal end B1p connected to the bend 54 while its distal end B1d is situated axially outside the slide 28 in order to be connected to the second rigid branch B2.

The proximal end B2p of the second rigid branch B2 is connected to the distal end B1d of the first rigid branch B1 by a first bend P1 that is plastically deformable about a first deformation axis A1.

Like the first branch B1, the second rigid branch B2 is conformed as a strip in line with the first rigid branch B1.

The first deformation axis A1 is orthogonal to the axial direction A of movement of the brake shoe and it is parallel to the planes in which the first rigid branch B1 and the second rigid branch B2 lie.

In order for the first bend P1 to constitute a plastically deformable area, this portion is mechanically weakened, here by means of a window or opening F1 which here is an open cut-out of rectangular shape axially oriented along the axis A1.

The invention is not limited to this embodiment of the plastically deformable area constituting the bend P1, and any other means of modifying the mechanical characteristics of the material constituting this area to render it plastically deformable in the sense of the invention may be used, such as a reduction of the thickness of the material in this area, for example.

In the same way, the proximal end B3p of the third rigid branch B3 is connected to the distal end B2d of the second rigid branch B2 by a second plastically deformable bend P2 that is deformable about a second deformation axis A2 parallel to the first deformation axis A1.

The second bend P2 is a bent portion of the strip of material including a window F2.

Finally, the proximal end B4p of the fourth branch B4 is connected to the distal end B3d of the third rigid branch B3 by a third plastically deformable bend P3 allowing deformation about a third deformation axis A3 parallel to the first deformation axis A1.

The third bend P3 includes a window F3 similar to the windows F1 and F2.

The fourth rigid branch B4 is straight and of axial general orientation parallel to the first rigid branch B1 and is extended here by an active lug 62 intended to be connected directly or indirectly to the associated brake shoe 18 (this is not limiting on the invention).

Here the active lug 62 is produced by extending the strip constituting the branches Bi and extends from the distal end B4d of the fourth rigid branch B4 in a transverse plane orthogonal to the plane of the fourth rigid branch B4.

For example, the free end section of the active lug 62 includes an open axial hole 64 to enable it to be fixed to an associated part of the brake shoe 18, for example its friction lining support plate 19.

By way of nonlimiting example, each of the branches Bi is stiffened here by a pressed area Zi formed in the body constituting each branch Bi.

As can be seen in FIGS. 3 and 4, the pressed area Z4 stiffening the fourth rigid branch B4 is extended into the body of the active lug 62 so that the right-angle bend 66 that connects them is itself rigid to guarantee in service the right-angle conformation between the first rigid branch B4 and the active lug 62.

In FIGS. 3, 4 and 5A, the return spring 48 is represented in a "new" initial state, i.e. before any plastic deformation of the bends Pi.

In this new or initial state, the first rigid branch B1 and the fourth rigid branch B4 are substantially parallel to each other and axially oriented at a transverse distance from each other, i.e. spaced by a distance D indicated in FIG. 5A.

By way of nonlimiting example, and as shown in the figures, the second and third rigid branches B2 and B3 are the same length and form between them an acute angle α2, here equal to approximately fifty eight degrees.

In the same way, the second rigid branch B2 forms with the first rigid branch B1 an obtuse angle α1 that here is substantially equal to the obtuse angle α3 formed between the third rigid branch B3 and the fourth rigid branch B4, which here is equal to approximately one hundred and fifty one degrees.

In contrast, and as can be seen more particularly in FIGS. 5A to 5C, in the state of maximum plastic deformation of the return spring 48, the first and fourth rigid branches B1 and B4 are still substantially parallel, axially oriented and spaced from each other by substantially the distance D, whereas the three bends Pi have been plastically deformed about respective the deformation axes Ai.

The first angle α1 has closed up so that the first rigid branch B1 and the second rigid branch B2 form between them an angle the value α1 of which is close to a right angle, here equal to approximately eighty degrees.

The angle α2 between the first rigid branch B2 and the second rigid branch B3 has opened out so that they form between them an angle the value of which is close to a right angle, here equal to approximately one hundred degrees.

Finally, the third angle α3 has opened out so that the third rigid branch B3 and the fourth rigid branch B4 extend axially, substantially in line with each other with an angle α3 the value of which is here close to 180 degrees.

By way of example, the thickness of the strip of material is between 0.5 and 0.8 millimeter and the material is X2CrNbCu21 or 304L (X2CrNi18-9/X2CrNi19-11) stainless steel.

By way of example, the maximum movement corresponding to the maximum wear J2 is equal to approximately 14 millimeters.

The function of the exterior return spring 48E in accordance with the invention is described next with reference to FIGS. 6A to 6D.

Figure 6A:
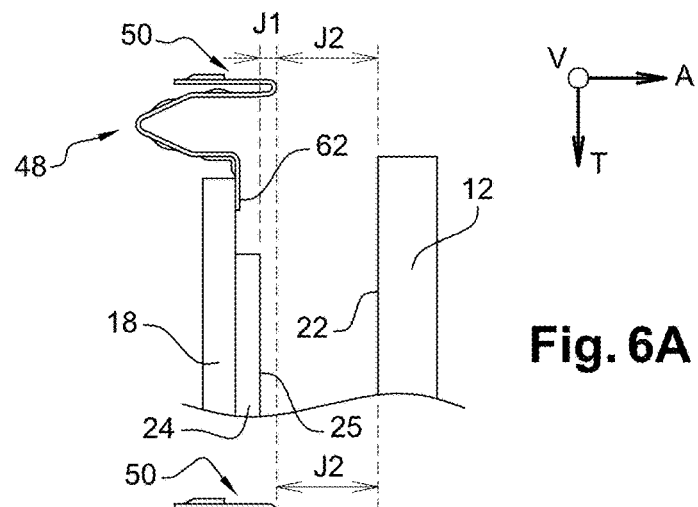
FIG. 6A is a diagrammatic sectional view in a horizontal plane passing through the lateral lugs of the brake shoe that shows a return spring and the brake shoe away from the friction disk at a distance greater than the operating clearance.

In FIG. 6A the brake shoe 18 is shown in an inactive position with pronounced wear of the friction lining 24. The brake shoe 18 is therefore arranged axially to the rear of the disk 12 and the transverse front friction face 25 of the friction lining 24 is at a distance equal to the sum of:
 the particular operating clearance "J1"; and
 a wear play "J2".

In the figures, for the purposes of the description, the clearance "J1" and the play "J2" have been exaggerated.

The return spring 48 is then in its rest state, likewise its elastically deformable parts.

Figure 6B:
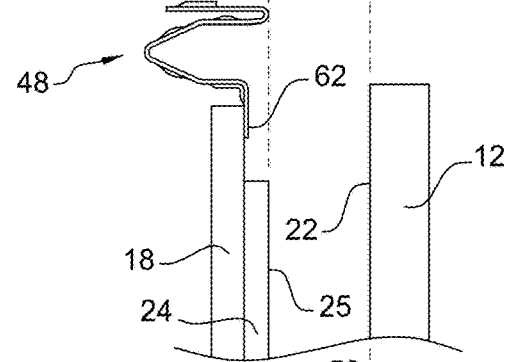
FIG. 6B is a view similar to that of FIG. 6A that shows the brake shoe spaced from the friction disk by a wear play after having traveled the operating clearance by elastically deforming the return spring relative to its position shown in FIG. 6A.
Figure 6C:
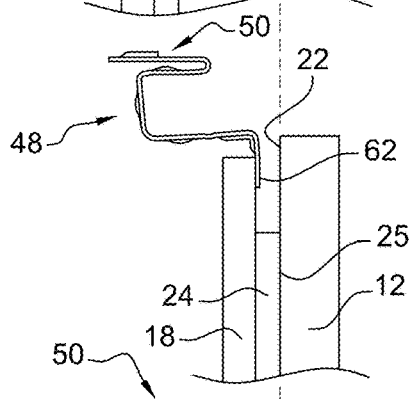
FIG. 6C is a view similar to that of FIG. 6A that shows the brake shoe in an active position clamped against the disk after plastic deformation of the play compensation spring relative to FIG. 6B.

When the brake shoe 18 is urged toward its active position by the piston 46, it first travels the distance corresponding to the particular operating clearance "J1", as shown in FIG. 6B.

During this first part of its travel, the brake shoe 18 drives the active lug 62 of the return spring 48 and the branch B4 so as to stretch the return spring 48 elastically between the fixing portion 50 fixed to the fixed support 14 and the active lug 62 fixed to the brake shoe 18.

The elastically deformable parts of the return spring 48 then reach their state of maximum elongation.

The bends Pi are deformed, at first elastically and then plastically.

The transverse front face of the friction lining 24 of the brake shoe 18 is still spaced from the associated face or annular track of the disk 12 by a distance equal to the wear play "J2". The brake shoe 18 therefore continues its axial travel as far as its active position shown in FIG. 6C.

During this second part of this travel, the elastically deformable parts no longer being able to deform "elastically", the clamping force is transmitted to the plastically deformable bends Pi of the return spring 48.

The plastically deformable bends Pi are therefore subjected to a force that tends to cause plastic angular deformations of the bends Pi about the associated deformation axes Ai.

The bends Pi are then deformed plastically, the elastic deformations of the plastically deformable parts being negligible compared to their plastic deformation.

Figure 6D:
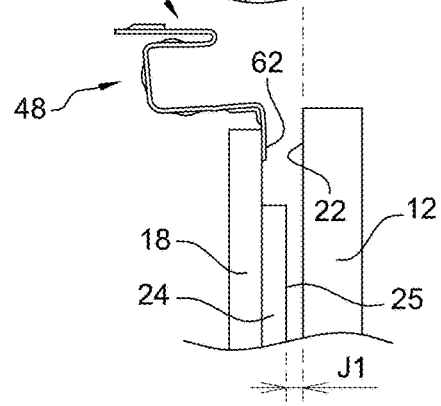
FIG. 6D is a view similar to that of FIG. 6A in which, relative to FIG. 6C, the brake shoe has been returned to its inactive position by the return spring.

When the braking operation ends, the brake shoe 18 is returned to its inactive position by the elastically deformable parts, which revert to their rest state, as shown in FIG. 6D.

The brake shoe 18 is therefore again spaced from the disk 12, by a distance equal to only the particular operating clearance "J1", the wear play "J2" having been absorbed by the plastic deformation of the plastically deformable bends Pi.

The return spring 48 therefore makes it possible to guarantee that the brake shoe 18 is returned to its inactive position.

Moreover, the arrangement of the plastically deformable bends Pi makes it possible to prevent the clamping force to be exerted by the piston 46 to actuate the brake shoe 18 to its active position does not become too high.

Additionally, by maintaining a constant operating clearance "J1" between the brake shoe 18 in the inactive position and the disk 12, the response time of the braking system remains constant independently of the wear of the friction lining 24.

For the purposes of choosing the material from which the return spring 48 is made, the breaking strain, the tensile strength and the 0.2% strain are preferably and by way of nonlimiting example chosen in the following ranges of values:
 30<breaking strain<60%; preferably 40<breaking strain<60%; and more preferably 50<breaking strain<60%,
 400<tensile strength<1000 MPa; preferably 400<tensile strength<700 MPa; and more preferably 400<tensile strength<600 MPa,
 0<strain<500 MPa; preferably 150<strain<400 MPa; and more preferably 200<strain<300 MPa,
where 1 MPa=$10^6$ Pa.

FIG. 7 shows diagrammatically a mounting spring 100 for the brake shoe 18 that can be fitted to the lugs 26 of a brake shoe 18 to mount and guide the brake shoe 18 in the associated axial slides 28 of the fixed support 14, with or without the sliders 34.

As known in itself, each shoe spring 100 includes a lower sliding branch 102 that cooperates with a horizontal lower face of the associated slide and applies to a horizontal upper facet of the lug 26 a force that causes it to bear vertically upward against a facing upper face of the slide 28.

In the conformation shown in FIG. 7, the shoe spring 100 is commonly referred to as a "snail spring" and includes a branch 104 bearing on the underside of a lower horizontal facet of the lug 26 of the brake shoe 18, this branch 104 forming part of a fixing branch or clip 106 which elastically clamps the lug 26 to fix the shoe spring 100 to the lug 26.

The shoe spring 100 further includes a curved branch 108 that connects the fixing branch 106 to the lower sliding branch 102, primarily providing the elasticity of the shoe spring 100.

Upon maximum complete wear of the friction lining, the return spring 48 is deformed plastically and, like the worn brake shoe 18, must be replaced.

A set or kit for replacing a worn set of brake shoes 18 therefore includes, for each brake shoe, a new brake shoe 18 as such and at least one set of two return springs 48 constituting a pair of return springs matched to the associated brake shoe.

If the brake shoe is of the type equipped with shoe mounting springs 100, the replacement kit includes, for each brake shoe, a new shoe equipped with its two shoe springs 100, one for each of its two radial lugs 26.

Depending notably on the design of the fixing part 50, the two springs equipping a brake shoe may be identical and interchangeable or constitute a pair of springs associated with and matched to a front and/or rear brake shoe.

The design of a return spring in accordance with the invention is not limited to the principal embodiment that has just been described.

It may notably vary significantly in terms of the design of the connecting part connecting the distal end B4$d$ of the fourth rigid branch B4 with the brake shoe to act thereon directly or indirectly.

It may also vary in terms of the design of the fixing part 50.

By way of example, FIG. 8 shows diagrammatically a variant embodiment in which the fixing part 50 is constituted of a lug 52 similar to the lug 62 that is connected to the proximal end B1$p$ of the first rigid branch B1 and lies in an orthogonal plane in order to be fixed, for example riveted, to an associated part of the fixed support 14.

The invention claimed is:

1. A spring (48) for elastically returning a brake shoe (18) of a disk brake (12) axially to an inactive position, said spring (48) including means for compensating wear play (J2) of a friction lining (24) of the brake shoe (18) that are deformed plastically when a travel of the brake shoe in an axial direction of movement as far as an active braking position is greater than a particular operating clearance (J1), the return spring (48) successively including:
   a portion (50) for fixing the return spring (48) to a fixed support (14) of the disk brake (12), the portion (50) comprising a blade (52) that is a strip that extends, in the axial direction of movement of the brake shoe (18) from a bend (54) forming an elastic hinge to a free end and comprising a first rigid branch (B1) that is a strip that lies in a plane parallel to the blade (52) a proximal end (B1$p$) of which is connected to the blade (52) by the bend (54), the bend being elastically deformable about a deformation axis orthogonal to the axial direction (A) of movement of the brake shoe (18) and parallel to the plane in which the second rigid branch (B2) lies;
   a second rigid branch (B2) a proximal end (B2$p$) of which is connected to a distal end (B1$d$) of the first rigid branch (B1) by a first bend (P1) plastically deformable about a first deformation axis (A1) parallel to the deformation axis of the bend (54); and
   a third rigid branch (B3) a proximal end (B3$p$) of which is connected to a distal end (B2$d$) of the second rigid branch (B2) by a second bend (P2) plastically deformable about a second deformation axis (A2) parallel to the first deformation axis (A1); and
   a fourth rigid branch (B4) a proximal end (B4$p$) of which is connected to a distal end (B3$d$) of the third rigid branch (B3) by a third bend (P3) plastically deformable about a third deformation axis (A3) parallel to the first deformation axis (A1) that cooperates directly or indirectly with an associated portion of the brake shoe (18);
   each rigid branch (B1, B2, B3, B4) is a strip that lies globally in a plane parallel to the first deformation axis (A1); and
   the fourth rigid branch (B4) is transversely spaced (D) relative to the fixing portion (50)
   wherein each rigid branch (B1, B2, B3, B4) includes stiffening means (Z1, Z2, Z3, Z4).

2. The spring as claimed in claim 1, wherein each rigid branch (B1, B2, B3, B4) is straight.

3. The spring as claimed in claim 1, wherein each plastically deformable bend (P1, P2, P3) includes an area (F1, F2, F3) of weakened mechanical properties.

4. The spring as claimed in claim 3, wherein each plastically deformable bend (P1, P2, P3) is a bent portion of a strip wherein the area of weakened mechanical properties in the form of a window oriented parallel to the first deformation axis (A1).

5. The spring as claimed in claim 1, wherein the spring is produced in one piece by cutting and shaping a sheet of material.

6. The spring as claimed in claim 5, wherein the spring is produced in one piece by cutting, pressing and bending a sheet of metal.

7. The spring as claimed in claim 1, wherein the rigid branches (B1, B2, B3, B4) and the bends (P1, P2, P3) are produced in one piece by cutting, pressing and bending a strip of constant width.

8. The spring as claimed in claim 1, wherein the second rigid branch (B2) and the third rigid branch (B3) are of substantially equal length.

9. The spring as claimed in claim 1, wherein, in a state preceding any plastic deformation of the bends (P1, P2, P3), the first rigid branch (B1) and the second rigid branch (B2) form an angle ($\alpha$1) equal to approximately 166 degrees.

10. The spring as claimed in claim 9, wherein, in a state preceding any plastic deformation of the bends, the third rigid branch (B3) and the fourth rigid branch (B4) form an angle (□3) equal to approximately 161 degrees.

11. The spring as claimed in claim 9, wherein, in the state of maximum plastic deformation of the bends (P1, P2, P3), the first rigid branch (B1) and the second rigid branch (B2) form an angle ($\alpha$1) that is substantially a right angle.

12. The spring as claimed in claim 1, wherein, in the state of maximum plastic deformation of the bends (P1, P2, P3), the third rigid branch (B3) and the fourth rigid branch (B4) are substantially aligned.

13. The spring as claimed in claim 1, wherein, in the state of maximum plastic deformation of the bends (P1, P2, P3), the second rigid branch (B2) and the third rigid branch (B3) form an angle ($\alpha$2) that is substantially a right angle.

14. The spring as claimed in claim 1, wherein the spring is made from a material selected from a group including stainless steel, X2CrNbCu21 steel, 304L steel, gold, lead, a synthetic material, a synthetic material with a polymer matrix reinforced by natural or synthetic fibers.

15. The spring as claimed in claim 1, wherein the spring is made from a material the breaking strain of which is between 30% and 60%, the tensile strength of which is between 400 MPa and 1,000 MPa, and the 0.2% strain of which is between 0 and 500 MPa.

16. The spring as claimed in claim 15, wherein the spring is made from a material the breaking strain of which is between 40 and 60%, the tensile strength of which is between 400 Mpa and 700 MPa and the 0.2% strain of which is between 150 and 400 MPa.

17. The spring as claimed in claim 16, wherein the spring is made from a material the breaking strain of which is between 50 and 60%, the tensile strength of which is between 400 MPa and 600 MPa, and the 0.2% strain of which is between 200 and 300 MPa.

18. A motor vehicle disk brake (10) that includes:
a brake disk (12) that lies in a plane transverse to an axially oriented axis (A) of rotation of the disk;
a support (14) fixed relative to a chassis of the vehicle,
at least one brake shoe (18) that includes a friction lining (24) a transverse friction face (25) of which cooperates with an associated annular braking track (22) of the disk (12), the brake shoe (18) being mounted to slide axially in the fixed support (14) between an active front position in which said friction face (25) bears against the associated annular braking track (22) of the disk (12) and an inactive rear position in which said friction face (25) is spaced axially from said associated annular braking track (22) of the disk by a particular operating clearance (J1), wherein the disk brake includes at least one spring (48) as claimed in claim 1 for elastically returning the brake shoe (18) to its inactive position.

19. The disk brake as claimed in claim 18, wherein the return spring (48) is disposed between the brake shoe (18) and the fixed support (14).

20. The disk brake (10) as claimed in claim 18, wherein the portion (50) for fixing the return spring (48) to the disk brake is fixed by axial insertion in an axially oriented slide (28) of the fixed support (14).

21. The disk brake (10) as claimed in claim 20, wherein the first rigid branch (B1) of the return spring (48) on the disk brake (12) includes a stop (60) that is in contact with a facing face of the fixed support (14) to block the axial sliding of the return spring (48) in the direction corresponding to the axial movement of the brake shoe (18) to its active braking position.

22. The disk brake (10) as claimed in claim 18, wherein the fixing portion (50) includes a first rigid branch (B1) that is a strip that lies in a plane parallel to the first deformation axis (A1), the proximal end (B2p) of the secondary rigid branch (B2) is connected to a distal end (B1d) of the first rigid branch (B1) by the first plastically deformable bend (P1), and the first rigid branch (B1) of the return spring (48) is fixed by axial insertion in an axially oriented fixing notch (30) of the fixed support (14).

23. The disk brake (10) as claimed in claim 22, wherein said at least one brake shoe (18) includes at least one lateral lug (26) for guiding sliding thereof that is received in an axial slide (28) of the fixed support (14) and said axially oriented fixing notch (30) is formed in a back of the slide (28).

24. The disk brake (10) as claimed in claim 22, wherein the brake shoe (18) includes at least one lateral lug (26) for guiding sliding thereof that is received in an axial slide (28) of the support and said notch (30) is formed by the slide (28).

25. The disk brake (10) as claimed in claim 18, further including a slider (32) that espouses the walls of an axially oriented slide (28) of the fixed support (14) and is fixed to the fixed support (14).

26. A replacement kit for a motor vehicle disk brake as claimed in claim 18, including at least one brake shoe (18) and two return springs (48) matched to said brake shoe (18).

27. The replacement kit as claimed in claim 26, further including two springs (100) for mounting the brake shoe in the disk brake.

* * * * *